Aug. 16, 1960

T. L. CRAIGE 2,949,591

MINIATURE INDUCTIVE DEVICES

Filed Oct. 10, 1955

INVENTOR
THEODORE L. CRAIGE

BY Raphael Tourover

ATTORNEY

Aug. 16, 1960 T. L. CRAIGE 2,949,591
MINIATURE INDUCTIVE DEVICES
Filed Oct. 10, 1955 2 Sheets-Sheet 2

INVENTOR
THEODORE L. CRAIGE

BY Raphael Tourover

ATTORNEY

United States Patent Office 2,949,591
Patented Aug. 16, 1960

2,949,591
MINIATURE INDUCTIVE DEVICES

Theodore L. Craige, Lynbrook, N.Y., assignor to United Transformer Corporation, New York, N.Y., a corporation of New York Filed Oct. 10, 1955, Ser. No. 539,395

8 Claims. (Cl. 336—83)

The present invention relates generally to miniature and sub-miniature inductive devices, including inductors and transformers, and to methods of fabricating these.

It is usual in the art of fabricating inductors and transformers to wind one or more coils on a bobbin of insulating material, and to associate the bobbin with a magnetic core fabricated of laminated or powdered magnetic material. The bobbin must possess sufficient mechanical rigidity to remain undeformed when subjected to the stresses created by the windings. In typical miniature and sub-miniature transformers and inductors or the like, intended for low voltage applications, as much as 40% of the window of the usual core structure may be occupied by the bobbin itself.

In accordance with the present invention, the coil bobbin of a miniature or sub-miniature inductor or transformer is fabricated of a single thickness of unpowdered magnetic material, and constitutes the core as well as the coil bobbin. A thin layer of insulating coating on the bobbin provides adequate insulation between core and coil for many uses, and the magnetic material may be sheet material, of nickel-iron alloy, to provide desirable magnetic properties, complete rigidity, and economy of fabrication. To complete the magnetic circuit of the core, a shell or sleeve of magnetic sheet material may be arranged in coaxial relation to the bobbin. The bobbin and its shell may be cylindrical in cross section to facilitate winding, and for economy of fabrication and of material.

In the structure above described, both the core and its shell provide a single short-circuited turn, resulting in considerable eddy current losses at the higher frequencies. Eddy current losses may be radically reduced by providing a slot or cut extending radially through the bobbin and through the shell, the slot or cut in the flange of the bobbin providing a convenient egress for the lead wires of the coil or coils which may be wound on the bobbin. The small wires of which the coils are fabricated may then be soldered or otherwise secured to heavy lead wires, which may extend into and be secured within the central axial aperture of the bobbin. This construction leads to ease of fabrication and to a structure in which considerable stress may be withstood by the lead wires without separation of these from the coil proper in response to stress.

The outer shell or sleeve may be snugly secured to the flanges of the bobbin by placing a cylindrical plastic sleeve around the finished assembly, the sleeve being fabricated of shrinkable plastic material, which expands when treated with a volatile solvent and shrinks as the solvent volatilizes. The shrinkage of the sleeve is uniform and occurs smoothly as a function of time, and the pressure applied by the sleeve is uniform around the circumference of the shell, assuring uniform fit and tightness of the shell to the bobbin. By impregnating the transformer with strongly bonding plastic material, such as one of the Epoxy type resins, the plastic sleeve may be removed after polymerization of the resin, leaving a completely sealed and rigid structure. In the alternative, the plastic sleeve may remain, if more convenient.

Small inductive devices, such as transformers, are operated frequently with direct current in one or more windings, which tends to saturate the core. This is normally compensated for by providing a core gap of precisely selected width. In cores according to the present invention, the effect of a variable air gap may be attained by adjustment of the axial relation of core and sleeve. Adjustment may proceed until an optimum condition is attained for a specific circuit, when the sleeve may be secured, as by gluing, or by the frictional holding force provided by the plastic sleeve.

In attempts to provide suitable air gaps in the cores of miniature and sub-miniature transformers, the gaps must be made extremely small. It is found that butt joints in units of laminated construction lead to unduly low reactance, because the gaps are great in relation to core size, while interleaving core laminations lead to high saturation effects and are not controllable or duplicatable. In general, the mechanical problems involved in providing optimum and duplicatable core gaps in miniature and sub-miniature transformers have been insoluble. The ease of adjustment of air gaps in constructions according to the present invention has led to optimum designs, economically attained. In one instance, in which comparable units employing stamped laminations and the construction of the present invention were compared for performance, an output of 50 milliwatts was obtained at 5% distortion in a transformer fabricated in accordance with the present invention, as against 1 milliwatt for a laminated construction of similar size.

Inductive devices arranged in accordance with the present invention may be employed as saturable reactors by employing an auxiliary saturating coil. The latter may extend through the central axial aperture of the core and about the flanges. If desired, the coil wound directly on the bobbin may serve as a saturating winding and the other as a controlled current winding, i.e. the functions of the separate coils may be interchanged.

As further variations of the invention, more than two flanges may be employed to provide a multiple bobbin core, and the sleeve may be arranged either as a unitary cylinder for all bobbin sections of the core or separate sleeves may be employed for the separate bobbin sections.

While the sleeve may preferably be secured about the rim of the flanges and externally thereof, it is also feasible to have the sleeves extend between the walls of the flanges. In either construction, the saturation reducing air gap is readily controllable, without employing expensive and slow methods of fabrication.

In accordance with a further modification of the invention, the bobbin may in its initial stages of fabrication, be solid, i.e. may not include a central axial aperture. It is nevertheless required that the bobbin not simulate a single short circuited turn, electrically. To this end radial slots are included in the flanges of the bobbin, and these slots are continued into the solid core of the bobbin, to provide an axial slot therein. The latter may have a depth equal to 50%, or more, of the diameter of the solid core, and constitutes therefore a substitute for the cylindrical axial aperture which is otherwise employed in various preferred embodiments of my invention.

It is, accordingly, a broad object of the present invention to provide a novel miniature inductive device.

It is another object of the invention to provide a novel core for miniature transformers.

It is still another object of the present invention to provide a novel closed core which requires neither laminations nor powdered iron construction.

Another object of the invention resides in the provision of a novel method of fabricating sub-miniature transformers.

Still another object of the invention resides in the provision of a novel lead construction for transformers, wherein an axial aperture in the transformer is employed for securing the transformer leads in rigid relation to the transformer core.

A futher object of the invention resides in the provision of a transformer having novel air gap adjustment features.

It is still another object of my invention to provide a novel sub-miniature transformer, having a bobbin fabricated from a solid core and radially extending flanges, in which radial slots are provided in the flanges, which extend to and from a continuation of a deep axial slot in the core element of the bobbin.

The above and still further objects, features and advantages of the present invention will become apparent upon consideration of the following detailed description of one specific embodiment thereof, especially when taken in conjunction with the accompanying drawings, wherein.

Figure 11:
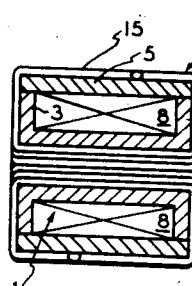
Figure 12:
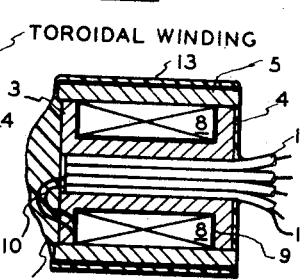
Figure 13:
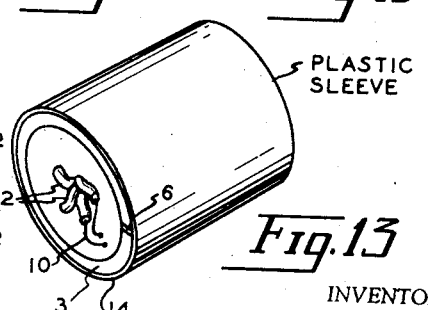
Figure 14:
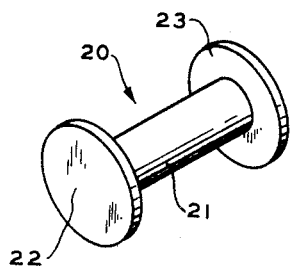
Figure 15:
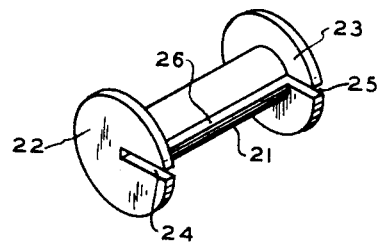
Figure 16:
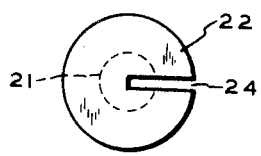

Figures 6–10, inclusive, illustrate in longitudinal cross section various bobbin and sleeve arrangements and modifications;

Figure 11 illustrates in longitudinal section a saturable reactor in accordance with the invention;

Figure 12 illustrates in longitudinal section a completed transformer impregnated with potting compound;

Figure 13 illustrates in perspective a transformer having a plastic sleeve about the slit magnetic sleeve thereof, for compressing the split magnetic sleeve;

Figure 14 is a view in perspective of a solid bobbin, employed in fabricating a further embodiment of the invention;

Figure 15 is a view in perspective of a modified bobbin arrangement utilizing an axial slot in a solid core element, in place of an axial cylindrical aperture;

Figure 16 is an end view of the bobbin of Figure 14; and

Figure 17:
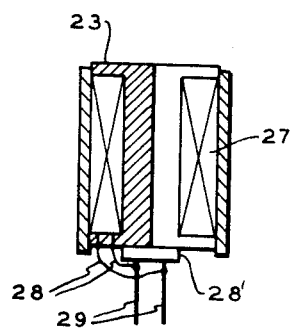

Figure 17 is a view in longitudinal cross-section of a complete transformer, employing the core of Figures 14–16.

Referring now more particularly to the accompanying drawing, the reference numeral 1 denotes a bobbin comprising a hollow right circular cylinder 2 and two flanges 3, 4 fabricated of thin sheet magnetic material of high permeability, such as a 45% or 78% nickel-iron alloy. The material is of sufficient thickness so that complete mechanical rigidity is available. Thickness between .003″ and .050″ have been successfully employed. The radial length of the flanges 3, 4 may have circular outlines concentric with the cylinder 2. The bobbin 1 may be formed as a unitary element from a tube of the requisite material, or may be fabricated directly form flat sheet, or turned from rod in ways which are per se well known in the art of metal working. Associated with the bobbin 1 is a cylindrical sleeve 5, which may be of the same material of which the bobbin is fabricated (different material may also be employed if desired) of the same inner diameter as the outer diameter of the flanges 3, 4, and of approximately the same or slightly greater axial length than the bobbin 1.

In accordance with the present invention, the bobbin 1 is utilized as a coil form, i.e. a coil or coils of an inductor or transformer are wound directly on the bobbin 1.

The sleeve 5 is then placed over the bobbin 1 and bridges the flanges 3, 4, thus providing a closed or complete magnetic circuit for the coil. Since the sleeve 5 and the bobbin 1 then form electrically a closed circuit of low resistance, high amplitude eddy currents tend to flow. To eliminate the possibility of eddy current flow, a radial cut 6 is made entirely through one radius of the flanges 3, 4, and of the central cylinder 2 (and a corresponding cut 7 through the sleeve 5) prior to winding the coil. In order to provide insulation between the coil 8 and the core, a thin layer of insulating compound 9, such as shellac, may be applied to the core prior to winding the coil thereon. It will be evident, on consideration of the direction of magnetic flux in the bobbin, that the presence of cuts 6 and 7 does not materially affect the magnetic circuit. The availability of cuts 6 and 7, however, is requisite to succeeding steps in the method of fabrication of inductive devices, according to the present invention.

When the winding or coil 8 has been placed on the bobbin 1, the coil ends 10 and 11, may be brought out through and along one or both of cuts 6 in the flanges 3, 4, and secured to heavy lead wires 12, which are extended through the axial aperture in the cylinder 2. The junction of the light leads 10, 11, and of the heavy leads 12, occurs then within the aperture or on the end face.

The sleeve 5 may thereafter be placed over the flanges 3, 4 symmetrically with the rims thereof, and overlapping these slightly on one or both sides. To assure a tight fit between the sleeve 5 and the rims of the flanges 3, 4, the sleeve 5 may then be enclosed in a thin sleeve 14 of plastic, such as vinyl tubing, which expands when subjected to the action of a volatile solvent, such as toluol or acetone, and which shrinks when the solvent volatilizes. The plastic sleeve 14 is applied in expanded condition and the solvent then permitted to volatilize. The sleeve then shrinks or contracts with great force, applying a strong uniform radial pressure to the sleeve 5, which increases uniformly as a function of time, compressing the sleeve 5 against the rims of the flanges 3, 4.

The entire assembly, including the axial aperture and the slots or cuts 6, may then be vacuum impregnated with a resin 13 having strong bonding qualities, such as resins of the Epoxy type, such as Shell No. 828 Epon. or other formulations which are commercially available.

Once the resinous binding material 13 has been set, the sleeve 14 may be removed or it may be retained, as desired. The binder 13 extends entirely through the cuts 6 and 9 and through the axial aperture in the bobbin 1, securing the leads securely against mechanical damage in response to applied force.

A matter of considerable importance in inductive devices, particularly in transformers, relates to the prevention of D.-C. saturation. For example, in audio transformers, or the like, any unbalanced direct current tends to saturate the core, which reduces sharply the effectiveness of the transformer in terms of output for a given allowable distortion and low frequency response. To offset core saturation, it is usual to provide a small air gap in the core, in the path of the magnetic flux. There is an optimum value or dimension for this gap in any specific application. In large transformers, a non-magnetic spacer is commonly employed to assure that an optimum gap is available. In small transformers, the optimum gap becomes so small that spacers are omitted and reliance placed on butting of magnetic elements of the cores. For miniature and sub-miniature transformers, the gap resulting from butting is too large. Resort is then commonly had to interleaving of laminations. None of these expedients has been found adequate.

Figure 10:
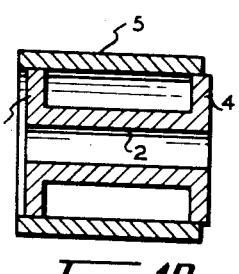

In accordance with the present invention, the requisite D.-C. desaturating gap is provided at the junction of the sleeve 5 with the rims of flanges 3, 4. Intimate contact is obtained, whereby the gap thickness is small. At the same time, gap area is relatively large since it occurs at the rims of the flanges. Moreover, adjustment of the effective gap to optimum conditions is obtainable by relatively axially moving the sleeve 5 and the bobbin 1, as shown in Figure 10.

While I have described a preferred embodiment of my invention, variants of the preferred structure may be resorted to, which may be fabricated in accordance with the method hereinbefore described.

Figure 1:
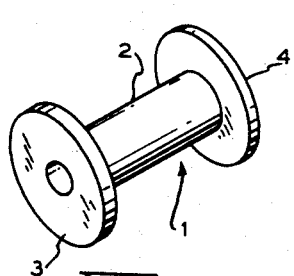
Figure 1 is a view in perspective of a magnetic coil bobbin in a first stage of its manufacture.
Figure 2:
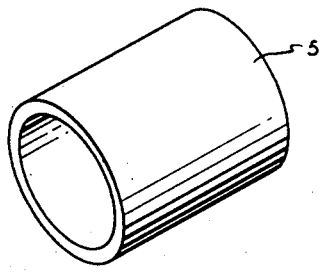
Figure 2 is a view in perspective of a magnetic sleeve for the bobbin of Figure 1.
Figure 3:
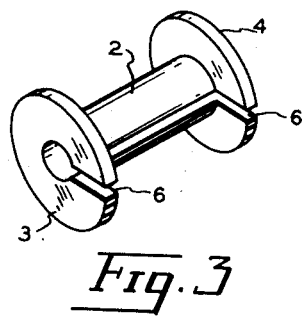
Figures 3 and 4 illustrate in perspective the introduction of radial slots in the bobbin and sleeve of Figures 1 and 2.
Figure 4:
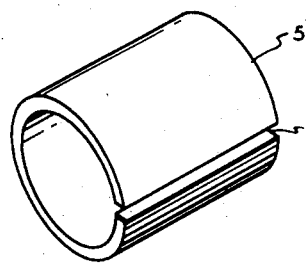
Figure 5:
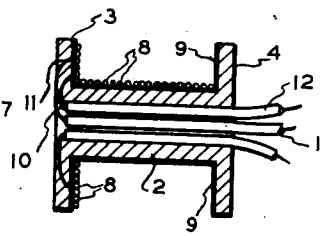
Figures 5 illustrates a longitudinal cross section through the bobbin of Figure 3, illustrating a mode of winding and lead arrangement.
Figure 6:
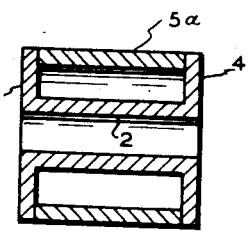
Figure 7:
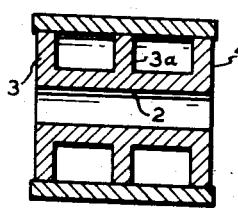
Figure 8:
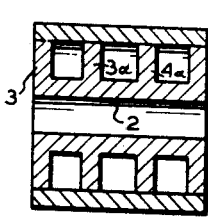
Figure 9:
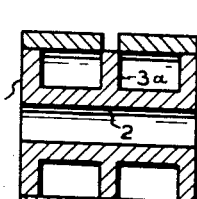

More specifically, in Figure 6 is illustrated a modification in which a sleeve 5a is positioned between the flanges 3, 4, instead of overlying the rims of flanges 3, 4. In Figure 7 is illustrated a structure employing three annular flanges 3, 4, and 3a. In Figure 8, four flanges 3, 4, 3a, and 4a are employed. Obviously, the number of flanges employed may be increased as desired and a separate coil or coils wound in each resulting bobbin section, the terminal leads of the windings being brought out through radial slots or cuts in the flanges. The sleeve 5 likewise may be fabricated in separate section, one for each one or more bobbin sections, or as desired. (See Figure 9.)

Reference is further made to Figure 11 of the accompanying drawings, wherein is illustrated a modification of the inductive device of the present invention to provide a saturable reactor. More specifically, a toroidal winding 15 is associated with the bobbin 1, threading through the axial aperture and around the flanges 3 and 4 and the sleeve 5. Control current may be applied to the toroidal winding 15, which serves to control the saturation of the magnetic circuit comprising bobbin 1 and sleeve 5. Thereby, flow of A.-C. current in the main coil 8 may be controlled in response to current flow in winding 15. Obviously, the functions of the several windings may be interchanged, in which case controlled current flows in winding 8, and saturating current in winding 15.

In accordance with still a further embodiment of the invention, illustrated in Figures 14–16 of the accompanying drawings, a bobbin is employed which in its initial stages of fabrication includes a solid core, i.e. which does not include a cylindrical central axial aperture.

Referring more particularly to Figure 14 of the accompanying drawings, the bobbin blank 20 is illustrated as including a solid core element 21, and two end flanges 22, 23. The blank 20 may be fabricated as by a machining operation, from solid stock, if desired, although other methods of fabrication may be employed, if desired.

The bobbin of Figures 15 and 16 may be fabricated from the blank 20 by a simple milling operation, suggested for example only, to provide a radial slot 24 in flange 22, a corresponding radial slot 25, in flange 23, and an axial slot 26 in solid core element 21, which joins the slots 24, 25, and forms a continuation thereof. The axially extending slot 26 may have a depth approximately equal to or greater than the semidiameter of the core element 21.

One or more coils 27 may be wound on the core of Figure 15, as illustrated in Figure 17 of the accompanying drawings, and the coil leads 28 may be brought out of one of the slots 24, and secured to a terminal assembly 28', secured to a flange 22, which provides a firm anchor for heavy leads 29.

It will be appreciated that the depth of the axially extending slot 26 may be reduced, in the limit, to zero, so that a solid core element results. The latter construction is desirable for maximum miniaturization, resulting in an increase in eddy current loss, but a concomitant increase in power handling ability. Increasing the depth of the slot 26 reduces eddy current losses, but also decreases power handling capacity. The actual depth of the slot, for any specific application, becomes then a matter of balancing design considerations, both electrical and mechanical.

The outer sleeve 30 may be secured to the bobbin as in the alternative modifications of my invention, and the structure may be impregnated with resin, similarly. The various alternative forms of magnetic sleeve, and the use of multiple flanges, as well as all the features of construction hereinabove described, are obviously applicable to the form of bobbin illustrated in Figures 14 and 17, inclusive.

While I have described and illustrated one specific embodiment of the present invention, it will become apparent that variations of the specific details of construction may be resorted to without departing from the true spirit and scope of the invention as defined in the appended claims.

What I claim is:

1. In combination, a sub-miniature cylindrical bobbin having a central hollow cylindrical element, and flanges extending radially from said element, at least one of said flanges having a radial slot, a winding on said bobbin, said winding having ends, said ends threaded through said radial slot, said bobbin constituting a magnetic core for said winding.

2. The combination in accordance with claim 1, wherein said winding ends are further threaded into said central hollow cylindrical element.

3. The combination in accordance with claim 2, wherein bonding material fills said central hollow cylindrical element.

4. A saturable reactor, comprising a bobbin having a central hollow cylinder and annular flanges extending radially from said cylinder, said bobbin fabricated of a solid sheet of magnetic material, a coil wound directly on said bobbin between said flanges, and a further coil wound toroidally about said flanges and through the interior of said hollow cylinder.

5. A sub-miniature inductive device including a solid sub-miniature bobbin of unpowdered magnetic material, said bobbin including a core element and a plurality of radially extending flanges, each of said flanges being provided with a radial slot, and said core element being provided with an axial slot which is a continuation of said radial slots, at least one coil wound on said bobbin, and leads for said coil extending through at least one of said slots, said bobbin constituting a magnetic core for said at least one coil.

6. A magnetic circuit for an inductive device including: a bobbin of a single thickness of unpowdered solid sheet material having high magnetic permeability, said bobbin including an open tubular element and at least two radially extending flanges rigidly secured to the open ends of said tubular element, said bobbin being the core of said magnetic circuit, wherein is provided a continuous radial slot extending through one radius of each of said flanges and the wall of said tubular element, wherein is further provided a sleeve of solid sheet magnetic material snugly fitting against the circumferences of said flanges and extending at least therebetween, wherein the sleeve is of substantially the same length as the bobbin but is axially displaced with respect to said flanges a predetermined small amount to provide a desirable air gap.

7. A magnetic circuit for an inductive device including: a bobbin of a single thickness of unpowdered solid sheet material having high magnetic permeability, said bobbin including a cylindrical element and at least two radially extending flanges rigidly secured adjacent the open ends of said cylindrical element, said bobbin being the core of said magnetic circuit, wherein is provided a continuous radial slot extending through one radius of each of said flanges and the radius of said cylindrical element, wherein is further provided a hollow cylindrical sleeve of solid sheet magnetic material, said sleeve having open ends and snugly fitting over the circumferences of said flanges and extending at least therebetween, and wherein said sleeve includes an axially extending slot joining the slots of said flanges.

8. A sub-miniature bobbin composed of one solid sheet of solid thin sheet material having high magnetic permeability, said bobbin including a hollow circular cylinder, and disc shaped flanges of said material rigidly secured at least to each end of said cylinder, said disc shaped flanges each having a central circular aperture substantially coextensive with the hollow of said cylinder, said bobbin constituting a magnetic core, each of said flanges being provided with a radial slot, said slots extending entirely radially through said flanges, and an axially directed slot in said cylinder joining said slots in said flanges, said flanges being joined together magnetically adjacent their outer circumferences by a further open-ended hollow cylinder of said solid thin sheet magnetic material, said further hollow cylinder including an axially directed slot joining said radial slots, and being adjustable axially with respect to said slots so as to provide a desirable air gap.

References Cited in the file of this patent

UNITED STATES PATENTS

| | | |
|---|---|---|
| 1,511,229 | McKee | Oct. 14, 1924 |
| 1,673,062 | Davis | June 12, 1928 |
| 2,544,152 | Gusdorf et al. | Mar. 6, 1951 |
| 2,567,412 | Van Ryan | Sept. 11, 1951 |
| 2,716,736 | Rex | Aug. 30, 1955 |
| 2,720,693 | Charbonneau et al. | Oct. 18, 1955 |
| 2,799,834 | Kirkland | July 16, 1957 |